United States Patent
Bhardwaj

(10) Patent No.: US 11,467,976 B2
(45) Date of Patent: Oct. 11, 2022

(54) WRITE REQUESTS WITH PARTIAL TRANSLATION UNITS

(71) Applicant: Micron Technology, Inc., Boise, ID (US)

(72) Inventor: Amit Bhardwaj, Hyderabad (IN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/943,387

(22) Filed: Jul. 30, 2020

(65) Prior Publication Data

US 2022/0035747 A1 Feb. 3, 2022

(51) Int. Cl.
*G06F 12/1009* (2016.01)

(52) U.S. Cl.
CPC .. *G06F 12/1009* (2013.01); *G06F 2212/7201* (2013.01)

(58) Field of Classification Search
CPC ............... G06F 2212/7201; G06F 12/1009
See application file for complete search history.

(56) References Cited

U.S. PATENT DOCUMENTS

| | | | | |
|---|---|---|---|---|
| 8,843,711 B1* | 9/2014 | Yadav | ..................... | G06F 3/064 |
| | | | | 711/201 |
| 2013/0013980 A1* | 1/2013 | Cideciyan | ............. | H03M 13/05 |
| | | | | 714/773 |
| 2014/0372668 A1* | 12/2014 | Yeh | ..................... | G06F 12/0292 |
| | | | | 711/103 |

\* cited by examiner

*Primary Examiner* — Chie Yew
(74) *Attorney, Agent, or Firm* — Lowenstein Sandler LLP

(57) ABSTRACT

A write request is determined to comprise at least a partial translation unit. A size of the partial translation unit is smaller than a size of a predefined translation unit. A first entry in a translation map is identified. The translation map maps a plurality of translation units to a plurality of physical blocks. The first entry identifies a first physical block corresponding to the predefined translation unit. A second entry in the translation map is created. The second entry identifies a second physical block. An association between the first entry and the second entry is created, such that the second entry corresponds to the predefined translation unit. A write operation is performed to write a set of data corresponding to the partial translation unit to the second physical block.

16 Claims, 6 Drawing Sheets

WRITE REQUESTS WITH PARTIAL TRANSLATION UNITS

TECHNICAL FIELD

Embodiments of the disclosure relate generally to memory sub-systems, and more specifically, relate to handling write requests with partial translation units in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
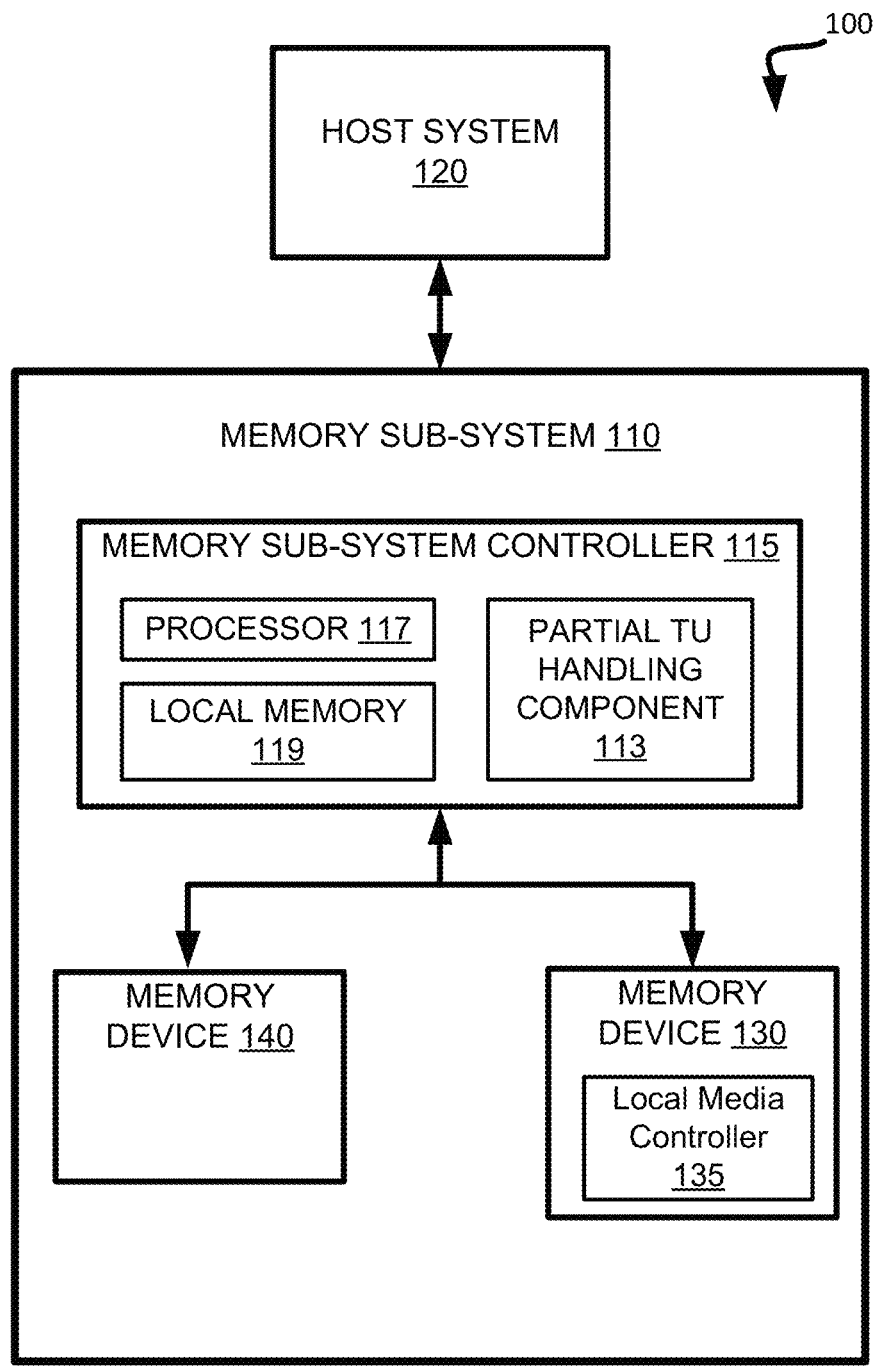
FIG. 1 illustrates an example computing system that includes a memory sub-system in accordance with some embodiments of the present disclosure.

Aspects of the present disclosure are directed to handling write requests with partial translation units in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

The memory sub-system can include non-volatile memory devices that can store data from the host system. One example of a non-volatile memory device is a negative-and (NAND) memory device. Other examples of non-volatile memory devices are described below in conjunction with FIG. 1. A memory device can include a set of physical pages for storing bits of binary data corresponding to data received from the host system. A physical page is a group of memory cells that store bits of data. For some types of memory devices (e.g., NAND), a physical page is the smallest unit of storage that can be written to ("write unit"). Physical pages can be grouped together to form a physical block. For some types of memory devices (e.g., NAND), a physical block is the smallest unit of storage that can be erased ("erase unit"). Physical pages within the blocks cannot be erased individually. If a page needs to be overwritten, it should be erased before it can be written to, and a memory erase operation may only be performed on a whole block, even if a single page of data needs to be erased.

The host system can use a logical address space to access the memory device. The logical address space can identify a group of logical units, such as logical blocks. For some types of memory devices (e.g., NAND), a logical block is the smallest erase unit. For example, the size of data in a logical block can be 512 bytes, 4096 bytes (4 KB), etc., depending on the memory device specification. In some examples, a logical block can be a group of logical pages. A logical page is an abstraction of physical pages. A memory sub-system can define a logical page to equal to a particular unit of physical storage (e.g., a physical page, a physical block, etc.). A logical block address (LBA) is an identifier of a logical block. In one addressing scheme for logical blocks, logical blocks can be located an integer index, with the first block being LBA 0, the second LBA 1, and so on.

The logical address space can be managed using a translation unit (TU). For some types of memory devices (e.g., NAND), a TU is a base granularity of data managed by the memory device. A TU can include a predefined number of logical units (e.g., logical pages, logical blocks, etc.). In some example, a TU is predefined to include one logical block, so the size of the TU equals to the size of the logical block. In some example, a TU is predefined to include multiple logical blocks. In that case, the size of the TU is a multiple of the size of the logical blocks.

In one example, a TU can be predefined to include one 512 byte logical block, so the size of the TU is 512 bytes. In another example, a TU can be predefined to include one 4 KB logical block (which can include multiple logical pages), so the size of the TU is 4 KB. In yet another example, a TU can be predefined to include eight 512 byte logical blocks, totaling a size of (8*512) bytes, or 4096 bytes (4 KB). In the last example, the size of the TU is 4 KB. The logical address space can start at LBA 0 and end with $LBA_{max}$. The logical space can be divided using a number of TUs (e.g., 4 KB size TUs), where each TU includes eight logical blocks. In one addressing scheme for TUs, TUs can be located an integer index, with the first TU being TU 0, the second TU 1, and so on. In an example, TU 0 can include eight LBAs starting from LBA 0 and ending at LBA 7. TU 1 can include the next eight LBAs, starting at LBA 8 and ending at LBA 15, and so on. The starting address and the ending address of the logical unit (e.g., logical blocks, logical pages, etc.) can define the boundaries of the TU.

When the host system requests to access data (e.g., read data, write data), the host system can send a data access request to the memory device directed to the logical address space. For example, the host system can provide a logical address (e.g., an LBA, an LBA with an offset, etc.) identifying the location where the data is to be stored at or read from. Since the data from the host system is eventually to be stored at a physical address within the memory device, the memory sub-system maintains a logical to physical (L2P) translation map, or table, to identify the physical location where the data corresponding to each logical address resides.

The L2P map can include a number of L2P entries. Each entry in an L2P map can identify a physical location corresponding to a particular TU. The L2P map tracks every TU segment that has been written to the memory sub-system by maintaining its physical address. For example, an L2P entry can include an index of the TU (e.g., TU 0, TU 1, etc.), corresponding range of physical addresses, some metadata, such as a flag that indicates whether the data at an address is valid or invalid, etc.

A host system can send a write request to write data to the memory device. The write request can include various information, such as a set of data, the logical address to store the data, etc. In one example, the write request can include a starting logical address where to start storing the set of data and a length or size of the data. In one example, starting logical address can include an LBA and an offset. The data segments received in a write request can be referred to as the received TUs. A write request can include multiple received TUs. A write request can include data that has a size (e.g., 4 KB) that is same or multiple of the size (e.g., 4 KB) of a TU in the L2P map and starts at a logical address that is a starting logical address of a TU. Such a write request is referred to as an "aligned write request," as the boundaries of the received TUs align (e.g., match) with boundaries of TUs in the L2P map.

When the host system requests to overwrite existing data with new data at a logical location, the existing data is marked invalid at the physical location that stored the existing data and the new data is stored in a new physical location. The memory sub-system updates the L2P map to indicate that the logical location corresponds to the new physical location. For an aligned write request, since a received TU aligns with the entirety of a TU in the L2P map, existing data corresponding to the entire TU is overwritten with the new data in the requested TU. The new data is stored in a new physical location and the entire TU in the L2P map points to the new physical location.

A write request can include a received TU that has a size that is less than the size of a TU in the L2P map. Such a write request is referred to as an "unaligned write request." The received TU is referred to herein as a partial TU. An unaligned write request can have multiple portions, where some portions correspond to received TUs that are aligned to TUs in the L2P map, and some portions correspond to received TUs that are unaligned to TUs in the L2P map. For example, a write request can include a starting logical address that is not aligned with the logical TU boundary. As a result, the beginning portion of the write request can include a partial TU that has a size less than the size of a corresponding TU in the L2P map. The partial TU in the beginning of a write request is referred to as a "head unaligned TU." In another example, the partial TU can end up in the end portion of the write request, where the ending logical address does not align with the logical TU boundary. The partial TU at the end of the write request is referred to as a "tail unaligned TU." An unaligned write request can include a head unaligned TU, a tail unaligned TU, or both.

For an unaligned write request, since a partial TU does not align with the entirety of a TU in the L2P map, only part of the existing data at a physical location corresponding to a part of the TU in the L2P map is overwritten with the new data in the partial TU. The part of the TU in the L2P map overlaps with the partial TU. Existing data associated with the remaining part of the TU stays unchanged, as the remaining part is outside of the write request, and is to be retained. In some implementations, to handle writing the data received in an unaligned write request, a memory sub-system can use a mechanism referred as a read-modify-write (RMW) mechanism. Under the RMW mechanism, the memory sub-system generates an internal read request to read existing data from the physical location into a memory buffer. The memory sub-system marks the part of the TU in the L2P map corresponding to the partial TU as invalid. The memory sub-system reads the remaining valid existing data associated with the remaining part of the TU (e.g., the data that is to remain unchanged) that does not overlap with the partial TU. The memory sub-system modifies the existing data by merging the valid existing data with the requested new data in the partial TU received from the host system. The memory sub-system writes the merged data including the valid existing data and the valid new data to a new physical location. The memory sub-system updates the L2P map to indicate that the TU corresponds to the new physical location. The RMW mechanism used for unaligned write requests can slow down performance of the memory sub-system. The memory sub-system performs extra read and modify operations, which lead to performance penalty. Additional resources are wasted to perform the extra read and modify operations. The efficiency of the memory sub-system is impacted when the unaligned write requests are handled using the RMW mechanism.

Aspects of the present disclosure addresses the above-referenced and other deficiencies related to performing a write request that includes a partial TU by writing the partial TU to a new location with the padded data and splitting the corresponding L2P entry into two L2P entries referencing both physical locations (i.e., the previously existing physical location storing the data for the logical address and the newly created physical location storing the data for the partial TU) corresponding to the logical address TU. In one embodiment, when the memory sub-system determines that the write request includes a partial TU, the memory sub-system can identify an existing L2P entry that identifies the original physical location corresponding to the boundary-aligned full TU that includes the partial TU. The memory sub-system can create an additional L2P entry, for the same index of the TU in the L2P map, identifying a new physical location storing the data for the partial TU. The memory sub-system can create an association (e.g., a link) between the existing L2P entry and the additional L2P entry, such that both of the L2P entries correspond to the TU. The memory sub-system can then write the new data received in the partial TU at the new physical location. This way, the TU can point to the original physical location with the valid existing data that is not requested to be overwritten and the new physical location with the new data received in the partial TU without having to perform additional read and modify operations.

Advantages of the present disclosure include, but are not limited to, improved performance of the memory sub-system, including improved random write performance and minimal impact on read performance, decreased power consumption, requiring less resources and computational power, and/or freeing system resources for other functionalities. Since additional read and modify operations are not performed to handle unaligned write requests, valuable resources can be saved and the memory sub-system does not have to slow down to perform the unaligned write request. The implementation is also simpler than conventional mechanisms, as both aligned and unaligned write operations are handled using the same primary techniques of writing to a new physical location, without first having to read and modify existing data. Eliminating the additional steps to perform internal read and modify operation can lead to decreased power consumption and overall decrease in resources used. The saved time and resources can be used to perform other functionalities.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transitorrandom-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a partial TU handling component 113 that can be used to handle write requests with partial TUs where data from the partial TUs are stored on the blocks of memory device 130 and 140. In some embodiments, the memory sub-system controller 115 includes at least a portion of the partial TU handling component 113. For example, the memory sub-system controller 115 can include a processor 117 (processing device) configured to execute instructions stored in local memory 119 for performing the operations described herein. In some embodiments, the partial TU handling component 113 is part of the host system 110, an application, or an operating system.

In one embodiment, the memory sub-system 110 can receive a write request, including a set of data and a starting logical address where to start storing the data. The partial TU handling component 113 can determine that the write request comprises at least one partial translation unit (TU). A translation unit can include one or more logical blocks. A size of a partial TU is smaller than the predefined TU utilized in a logical to physical (L2P) translation map. The L2P map, which maps a plurality of translation units to a plurality of physical blocks, is used to identify the physical location where the data corresponding to a logical address in the write request resides. In some examples, the TU comprises a predefined number of logical units, such as, logical pages, logical blocks, etc. In some examples, the TU represents a base granularity of data managed by a memory device. In one example, a size of the TU can be 4 KB. The TU can have boundaries defined by a starting logical address and an ending logical address. In one example, the write request is determined to include a partial TU by determining that the starting logical address indicated in the write request does not correspond to the starting address of the TU in the L2P map. In another example, partial TU is the last element of a number of TUs included in the write request. When the partial TU handling component 113 determines that the write request includes a partial TU, the partial TU handling component 113 can identify an existing L2P entry that identifies the original physical location corresponding to the TU. The partial TU handling component 113 can create an additional L2P entry identifying a new physical location. The partial TU handling component 113 can create an association (e.g., a link) between the existing L2P entry and the additional L2P entry, such that both of the L2P entries correspond to the TU in the L2P map. The memory sub-system can then write the new data received in the partial TU at the new physical location. Further details with regards to the operations of the partial TU handling component 113 are described below.

Figure 2:
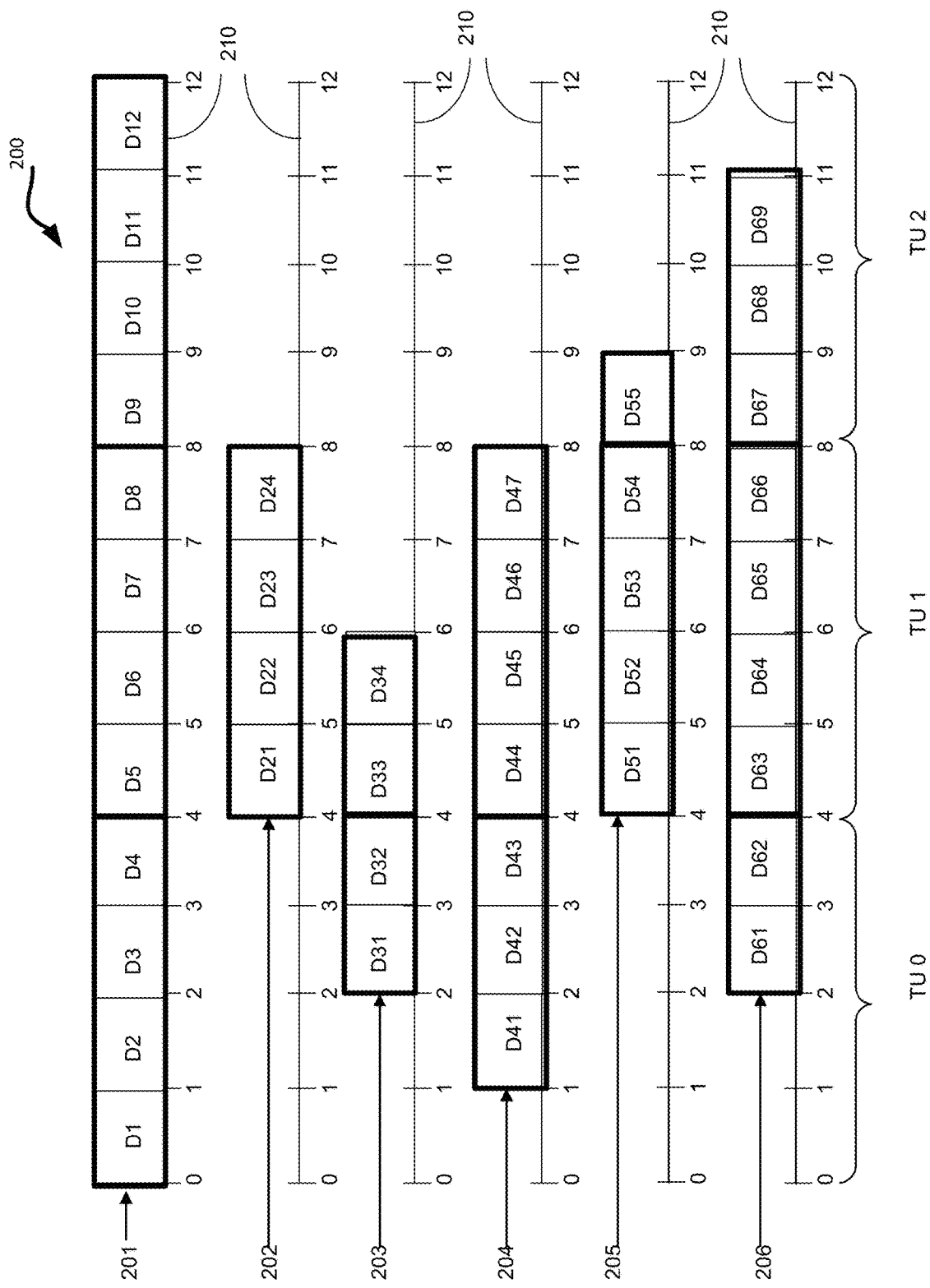
FIG. 2 depicts examples of full and partial translation units in write requests, in accordance with some embodiments of the present disclosure.

FIG. 2 depicts examples of full and partial translation units in write requests in a memory sub-system 200, in accordance with some embodiments of the present disclosure. Six example write requests 201-206 are shown. The write requests 201-206 are received from the host system and can indicate a set of data to store, a starting logical address for starting the write operation, and a size of the set of data.

In this particular memory sub-system, the axis 210 represents the size, in KB, of logical units for a portion of a logical address space in memory sub-system 200. The portion of the logical address space can accommodate 0 to 12 KB of data. The portion of the logical address space is divided in three TUs, TU 0, TU1, and TU 2. Each TU is predefined to include four logical units (e.g., logical pages, logical blocks, etc.). The size of each logical unit is 1 KB. Thus, the size of each TU is (4*1 KB) or 4 KB. TU 0 starts at logical address corresponding to 0 KB and ends at logical address corresponding to 4 KB of the logical address space, TU 1 starts at 4 KB and ends at 8 KB, TU 2 starts at 8 KB and ends at 12 KB.

For write request 201, the host system indicates a starting logical address that corresponds to 0 KB, and the size of the data set D1-D12 in write request 201 is 12 KB. The size of data in write request 201 (e.g. 12 KB) is a multiple of the size of each TU and the write request starts at 0 KB, which is also the starting address for TU 0. Thus, the write request includes three data segments that each fully overlap with each of the TUs. These data segments are referred to as received TUs. Since each of the received TUs in the write request 201 aligns with a TU in the logical address space, the write request is an aligned write request. For example, the boundaries of received TU with data D1-D4 aligns with boundaries of TU 0.

For write request 202, the starting logical address corresponds to 4 KB, and the size of the data set D21-D24 in write request 202 is 4 KB. The size of data in write request 201 (e.g. 4 KB) is the same as the size of the TU 1 and the write request starts at 4 KB, which is also the starting address for TU 1. Thus, the write request includes one data segment that fully overlap with one TU 1. Since the only received TU in the write request 202 aligns with a TU, the write request 202 is also an aligned write request. The boundaries of received TU with data D21-D24 aligns with boundaries of TU 1.

For write request 203, the starting logical address corresponds to 2 KB, and the size of the data set D31-D34 in write request 202 is 4 KB. The size of data in write request 203 (e.g. 4 KB) is the same as the size of each TUs, but the write request starts at 2 KB, which does not correspond to the starting address for any TU. Thus, the write request includes two data segments that each partially overlap with one of the TUs. The data segment with data D31-D32 partially overlaps with TU 0, for addresses corresponding to 2 KB to 4 KB. This data segment with data D31-D32 is a partial TU, with the size of the partial TU being 2 KB which is less than the 4 KB size of the TU 0. The partial TU is in the beginning of the write request 203, so it is a head unaligned TU. Similarly, data segment with data D33-D34 partially overlaps with TU 1, and is a partial TU, with a 2 KB size that is smaller than the 4 KB size of the TU 1. The partial TU is at the end of the write request 203, so it is a tail unaligned TU.

Write request 204 has a starting logical address corresponding to 1 KB, and the size of the data set D41-D47 in write request 204 is 7 KB. Since the write request starts at 1 KB, which is not the starting address of any TU and the size of data in write request 204 (e.g. 7 KB) is not the same or multiple of the size of each TUs, the write request is an unaligned write request. The write request includes two data segments. One data segment partially overlaps with one of the TUs (TU 0). The data segment with data D41-D43 partially overlaps with TU 0, for addresses corresponding to 1 KB to 4 KB. The partial TU with data D41-D43 is has a size of 3 KB, which is less than the 4 KB size of the TU 0. The partial TU is in the beginning of the write request 203, so it is a head unaligned TU. On the other hand, data segment with data D44-D47 fully overlaps with TU 1, with a 4 KB size as the TU 1 and the starting address for this segment is at 4 KB, which is the starting address for TU 1. This received TU is an aligned TU in the unaligned write request 204.

Write request 205 has a starting logical address corresponding to 4 KB, and the size of the data set D51-D55 in write request 205 is 5 KB. The size of data in write request 204 (e.g. 5 KB) is not the same or multiple of the size of each TUs, so the write request is an unaligned write request. However, since the write request starts at 4 KB, which is the starting address of TU 1 and the size of received TU with data D51-D54 is 4 KB, the received TU is an aligned TU. The second data segment with data D55 partially overlaps with one of the TUs (TU 2), for addresses corresponding to 8 KB to 9 KB and has a size of 1 KB, which is smaller than size of the TU 2. The partial TU is at the end of the write request 205, so it is a tail unaligned TU.

Finally, write request 206 includes a starting address corresponding to 2 KB and a size of 9 KB. The starting address does not correspond to any TU starting address, so it is an unaligned write request. The unaligned write request includes a head unaligned TU with data D61-62 partially overlapping TU 0, an aligned TU with data D63-D66 that fully overlaps with TU 1, and a tail unaligned TU with data D67-D69 partially overlapping with TU 2. The tail unaligned TU is a last element of the plurality of received TUs in the write request 206.

The partial TU handling component 113 of FIG. 1 can be used to handle write requests with unaligned TUs as shown in the examples of FIG. 2.

Figure 3:
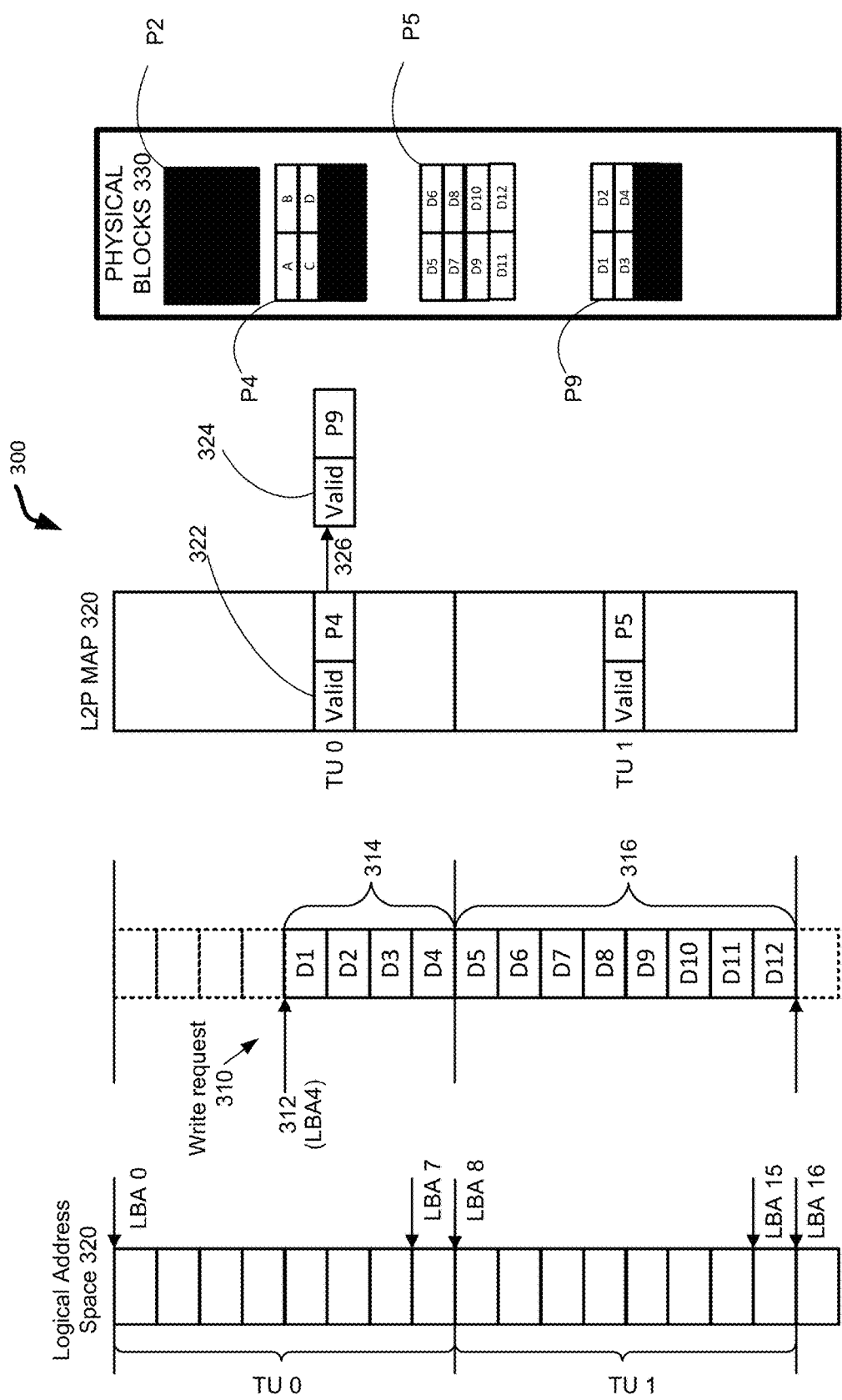
FIG. 3 depicts an example of handling write requests with partial translation units, in accordance with some embodiments of the present disclosure.

FIG. 3 depicts an example of handling write requests with partial translation units for a memory device 300, in accordance with some embodiments of the present disclosure. Memory device 300 can correspond to the memory device 130 and/or 140 in depicted in FIG. 1.

In one embodiment, a logical address space 320, which identifies logical units, can be used by the host system 120 to access the memory device 300. A logical unit can include a logical page, a logical block, etc. The granularity of logical units shown in FIG. 3 for logical address space 320 is a logical block. A logical block can be a group of logical pages (not shown). In the example, each logical block has a size of 512 bytes. The logical block address space 320 can identify a group of logical blocks using logical block addresses (LBAs). Using one addressing scheme, logical blocks are shown to be located an integer index, with the first block being LBA 0, the second LBA 1, and so on.

The logical address space 320 can be managed using a translation unit (TU). A TU is a base granularity of data managed by the memory device 300. A TU is a group of logical units. A TU can include a predefined number of logical units (e.g., logical pages, logical blocks, etc.). Here, a TU is predefined to include eight logical blocks, so the size of the TU equals to eight times the size of the logical blocks, that is (8*512 bytes), or 4096 bytes (4 KB). Using one addressing scheme, TUs can be located an integer index, with the first TU being TU 0, the second TU 1, and so on. In an example, TU 0 can include eight LBAs starting from LBA 0 and ending at LBA 7. TU 1 can include the next eight LBAs, starting at LBA 8 and ending at LBA 15, and so on. The starting address and the ending address of the logical blocks define the boundaries of the TU. Although the TU here is shown to include eight logical blocks, in another embodiment, the TU can include one logical block, which includes a number of logical pages.

The host system 120 can send a data access request, such as a read request or a write request, to the memory device 300 directed to the logical address space 320. The host system 120 can provide LBAs on which the data access is to be performed. For example, the host system 120 can provide a starting LBA (or a starting LBA plus a logical page offset) and a size of the requested data access. In one embodiment, the memory device 300 receives a write request 310. The write request 310 indicates a starting logical address 312 (e.g., LBA 4, LBA 4 plus a page offset, etc.). The write request 310 includes a set of data D1-D12 to be stored starting at address 312 and a size of the data is indicated as 6 KB. Thus, the write request 310 covers 12 logical blocks that equal to 6 KB (e.g., 12*512 bytes), which is requested to be stored starting at starting address 312, or LBA 4.

Since a TU includes eight logical blocks, the write request 310 includes at least one segment that is smaller than a TU in the logical address space. The segment that is smaller than the TU represents a partial TU included in the plurality of TUs (e.g., group of logical blocks) received in the write request 310. A size of a partial TU is smaller than the size of a TU in the logical address space. Since the write request starts at LBA 4, which is not the starting address of any TU (e.g., LBA 0, LBA 8, etc.), and the size of data in write request 310 is 6 KB, which is not the same or multiple of the size of each TUs (e.g., 4 KB), the write request is an unaligned write request. Each partial TU in the write request represents an unaligned TU in the write request.

In one embodiment, the partial TU handling component 113 determines whether the write request 310 includes at least one unaligned TU. If it is determined that the write request does not include any unaligned TU, then the aligned TUs in the write request are processed to write the data in the received TUs to the memory device 300. Any existing data corresponding to the requested logical blocks is marked invalid at the physical location that stored the existing data and the new data is stored in a new physical location, updating the L2P map with the new physical location.

In one embodiment, the partial TU handling component 113 determines that the write request 310 includes at least one unaligned TU (e.g., one partial TU). The segment 314 in write request 310 is determined to be a partial TU. The segment 314 starts at LBA 4 and includes four logical blocks. The segment 314 partially overlaps with logical blocks (e.g., LBA 4 to LBA 7) included in TU 0, which ranges from LBA 0 to LBA 7. A size of the partial TU represented by segment 314 is 2 KB, which is smaller than the size of the TU 0 (e.g., 4 KB) that the partial TU partially overlaps with. The partial TU handling component 113 can determine that the size of the partial TU is smaller than the size of the TU in the logical address space (e.g., TU 0) when the starting logical address 312 indicated in the write request 310 does not correspond to the starting address (e.g. LBA 0) of the TU. In this scenario, since the partial TU 314 is at the beginning of the write request 310, it is considered a head unaligned TU. In another example not shown in FIG. 3, the partial TU can end up in the end portion of the write request 310 (e.g., spanning LBA 16 to LBA 17), where the ending logical address (e.g., LBA 17) does not align with an ending logical address of a TU in the logical address space (e.g., TU 2). The partial TU would be the last element of a number of received TUs included in the write request. In that scenario, the partial TU at the end of the write request would be a tail unaligned TU. In one example not shown in FIG. 3, the unaligned write request 310 can include a head unaligned TU as well as a tail unaligned TU.

In an embodiment, when the partial TU handling component 113 determines that the write request 310 includes a partial TU 314, the partial TU handling component 113 identifies an existing entry 322 corresponding to the TU 0 in a logical to physical (L2P) translation map 320. The L2P map 320 is shown to map the logical units to the physical units at a granularity of physical blocks. As such, the L2P map 320 maps a plurality of translation units to a plurality of physical blocks. The L2P map 320 is used to identify the physical location where the data corresponding to a logical address in the write request resides. The entry 322 identifies a physical block P4 corresponding to the TU 0.

In an embodiment, the partial TU handling component 113 determines whether the entry 322 is valid. For example, the entry 322 can include metadata, or a flag, that indicates that the entry is valid or invalid. In an example, if the entry 322 is determined to be invalid, then the physical block P4 does not include existing data. In that case, the partial TU handling component 113 can designate the entry 322 to be valid and update an entry at TU 0 to include a new physical block where the data D1-D4 of partial TU 314 is to be written, and the memory sub-system writes the data D1-D4 in the new physical block.

In an example, if the entry 322 is determined to be valid, then the physical block P4 identified in the entry 322 is determined to include existing valid data. A part of this existing valid data is to remain unchanged because the partial TU does not cover this part and another part of this existing valid data is to be overwritten with the data D1-D4 in the partial TU 314. The partial TU handling component 113 creates an additional L2P entry identifying a new physical location. The partial TU handling component 113 creates entry 324 in L2P map 320 identifying a new physical block P9. The new physical block P9 is to store data D1-D4 in the partial TU 314.

The partial TU handling component 113 creates an association (e.g., a link) between the existing L2P entry 322 and the additional L2P entry 324. The association is depicted by arrow 326. The association 326 is created such that both of the L2P entries 322 and 324 correspond to the TU 0 in the L2P map 320. As a result, the map 320 includes L2P entries at TU 0 that point to two different physical blocks, that is, physical block P4 which includes the part of the existing data that remains unchanged (e.g., values A to D in block P4) by the host write request 310, as well as physical block P9 that is to include the new data D1-D4 that the host requests to write. In an example, the association 326 can be created using a linked list, a pointer, an array, or any other mechanism that can link the two entries.

In an example, the partial TU handling component 113 designates a first part of the entry 322 as having valid data, a second part of the entry 322 as having invalid data, a first part of the entry 324 as having valid data, and a second part of the entry 324 as having invalid data. For example, a flag can be maintained to indicate whether a part of an L2P entry has valid or invalid data. In one example, an L2P entry can include a physical addresses of the physical location corresponding to a particular TU. The physical address can be for different levels of granularity, depending on the specification used for the memory sub-system. Each physical address in an L2P entry can have a corresponding flag. If there is valid data at a first physical address, a first flag corresponding to the first physical address in the L2P entry can be set to indicate that there is valid data. Similarly, if there is invalid data at a second physical address, a second flag corresponding to the second physical address in the L2P entry can be set to indicate that there is invalid data.

In an embodiment, the memory sub-system 110 performs a write operation to write the new data D1-D4 received in the partial TU 314 at the new physical block P9. In an example, the new block P9 is also written with some padded data (e.g., zeroes). In some example, the pages with the padded data can be designated to be invalid. In an embodiment, the partial TU handling component 113 designates the physical block P4 and P9 as having priority for garbage collection. Since the block P4 and P9 include some invalid data introduced to handle the unaligned write requests more efficiently, some additional physical block locations are allotted to accommodate the mechanism. With a prioritized garbage collection indication, the physical blocks with invalid data can be freed up for other usage. By linking the entries 322 and 324, the partial TU in the write request can be handled without having to perform additional read and modify operations that the RMW mechanism necessitates. When reading the data corresponding to TU 0, the memory sub-system can read valid data from both P4 and P9 as both of the blocks are included in the L2P map at TU 0.

In one embodiment, data D5-D12 from the aligned TU 316 in write request 310 is written in physical block P5. Prior to writing this data, map 320 included an old entry (not shown) to point TU 1 to a previous physical block P2 including existing data (e.g., values I-P). Since the aligned TU 316 fully aligns with TU 1, the data previously pointed by TU 1 can be overwritten entirely and the new data is stored in new block P5, marking the old data in block P2 as invalid.

Figure 4:
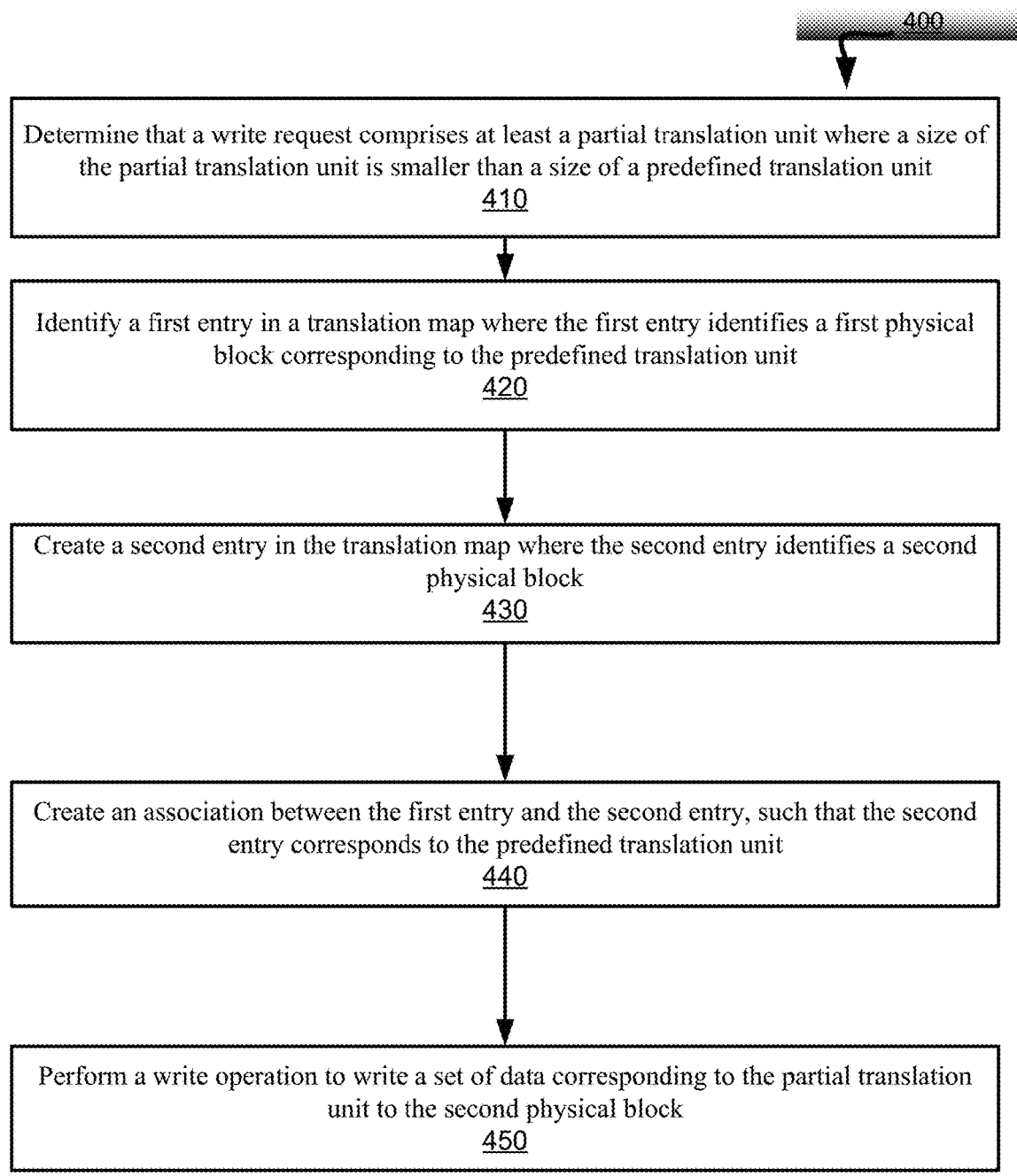
FIG. 4 is a flow diagram of an example method to handle write requests with partial translation units, in accordance with some embodiments of the present disclosure.

FIG. 4 is a flow diagram of an example method 400 to handle write requests with partial translation units, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the partial TU handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic determined that a write request comprises at least a partial translation unit. In some examples, a size of the partial translation unit is smaller than a size of a predefined translation unit. In some examples, the predefined translation unit comprises a predefined number of logical pages. In some examples, the predefined translation unit represents a base granularity of data managed by a memory device associated with the processing logic. In one examples, the write request is determined to include a partial TU by determining that a starting logical address indicated in the write request does not correspond to a starting address of the predefined translation unit. In another example, the partial translation unit is a last element of a set of translation units specified by the write request.

At operation 420, the processing logic identifies a first entry in a translation map. In an example, the translation map maps a plurality of translation units to a plurality of physical blocks. In an example, the first entry identifies a first physical block corresponding to the predefined translation unit. In an example, the processing logic determines that the first physical block includes existing valid data.

At operation 430, the processing logic creates a second entry in the translation map. In an example, the second entry identifies a second physical block. In some example, the processing logic further designates a first part of the first entry as having valid data, a second part of the first entry as having invalid data, a first part of the second entry as having valid data, and a second part of the second entry as having invalid data. At operation 440, the processing logic creates an association between the first entry and the second entry. In an example, the second entry corresponds to the predefined translation unit.

At operation 450, the processing logic performs a write operation to write a set of data corresponding to the partial translation unit to the second physical block. In some example, the processing logic further designates the first physical block and the second physical block for having priority for garbage collection.

Figure 5:
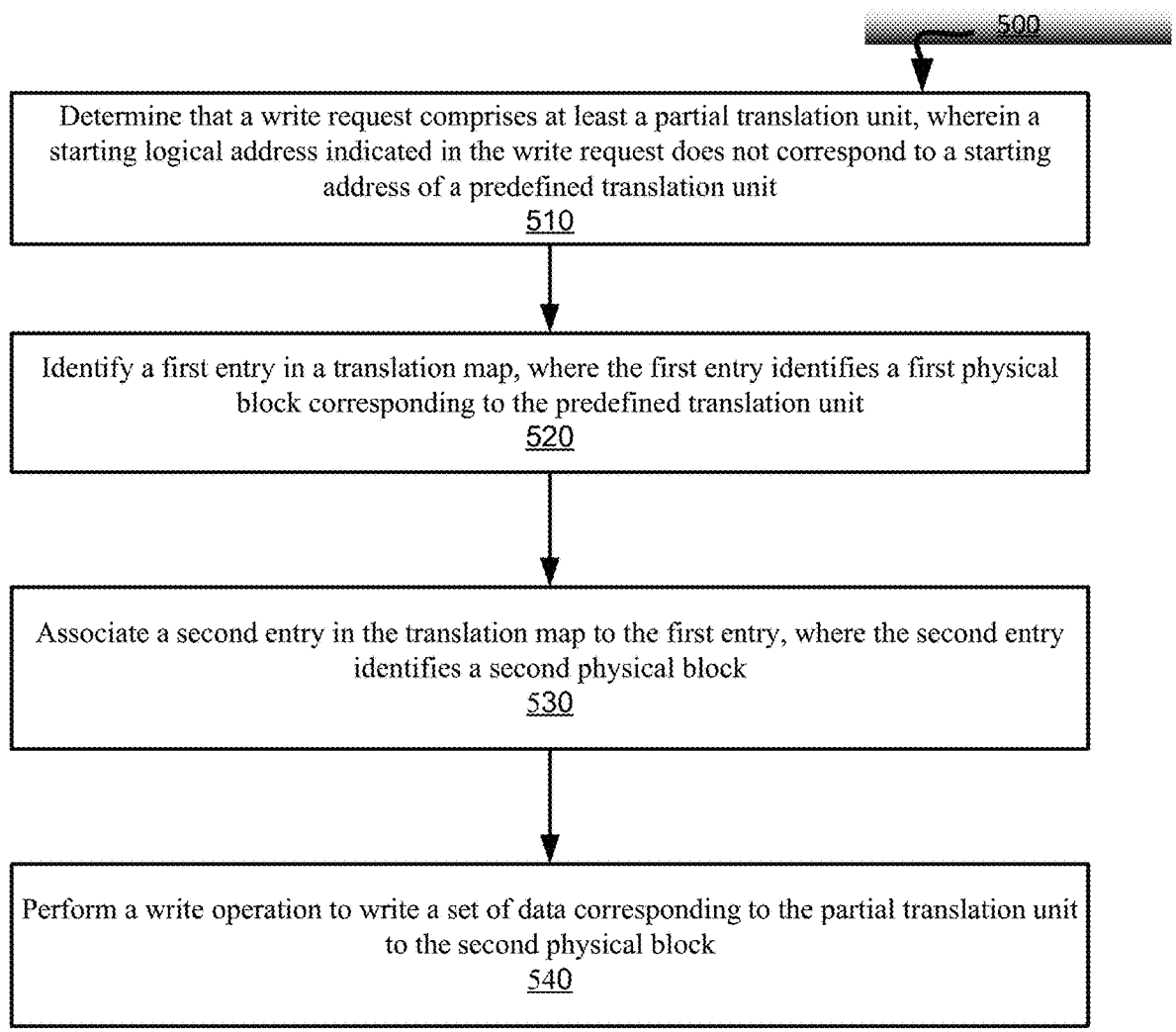
FIG. 5 is a flow diagram of an example method for performing a write request that includes a partial translation unit, in accordance with some embodiments of the present disclosure.

FIG. 5 is a flow diagram of an example method 500 for performing a write request that includes a partial translation unit, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the partial TU handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic determines that a write request comprises at least a partial translation unit. In one example, a starting logical address indicated in the write request does not correspond to a starting address of a predefined translation unit. In another example, a size of the partial translation unit is smaller than a size of a predefined translation unit and the partial translation unit is a last element of a set of translation units specified by the write request. In some examples, the predefined translation unit comprises a predefined number of logical pages. In some examples, the predefined translation unit represents a base granularity of data managed by a memory device associated with the processing logic.

At operation 520, the processing logic identifies a first entry in a translation map. In an example, the translation map maps a plurality of translation units to a plurality of physical blocks. In some examples, the first entry identifies a first physical block corresponding to the predefined translation unit.

At operation 530, the processing logic associates a second entry in the translation map to the first entry. In some examples, prior to associating the second entry to the first entry, the processing logic creates the second entry in the translation map. In some examples, the second entry identifies a second physical block. In some examples, the second entry corresponds to the predefined translation unit. In some example, the processing logic further designates a first part of the first entry as having valid data, a second part of the first entry as having invalid data, a first part of the second entry as having valid data, and a second part of the second entry as having invalid data.

At operation 540, the processing logic performs a write operation to write a set of data corresponding to the partial translation unit to the second physical block. In some example, the processing logic further designates the first physical block and the second physical block for having priority for garbage collection.

Figure 6:
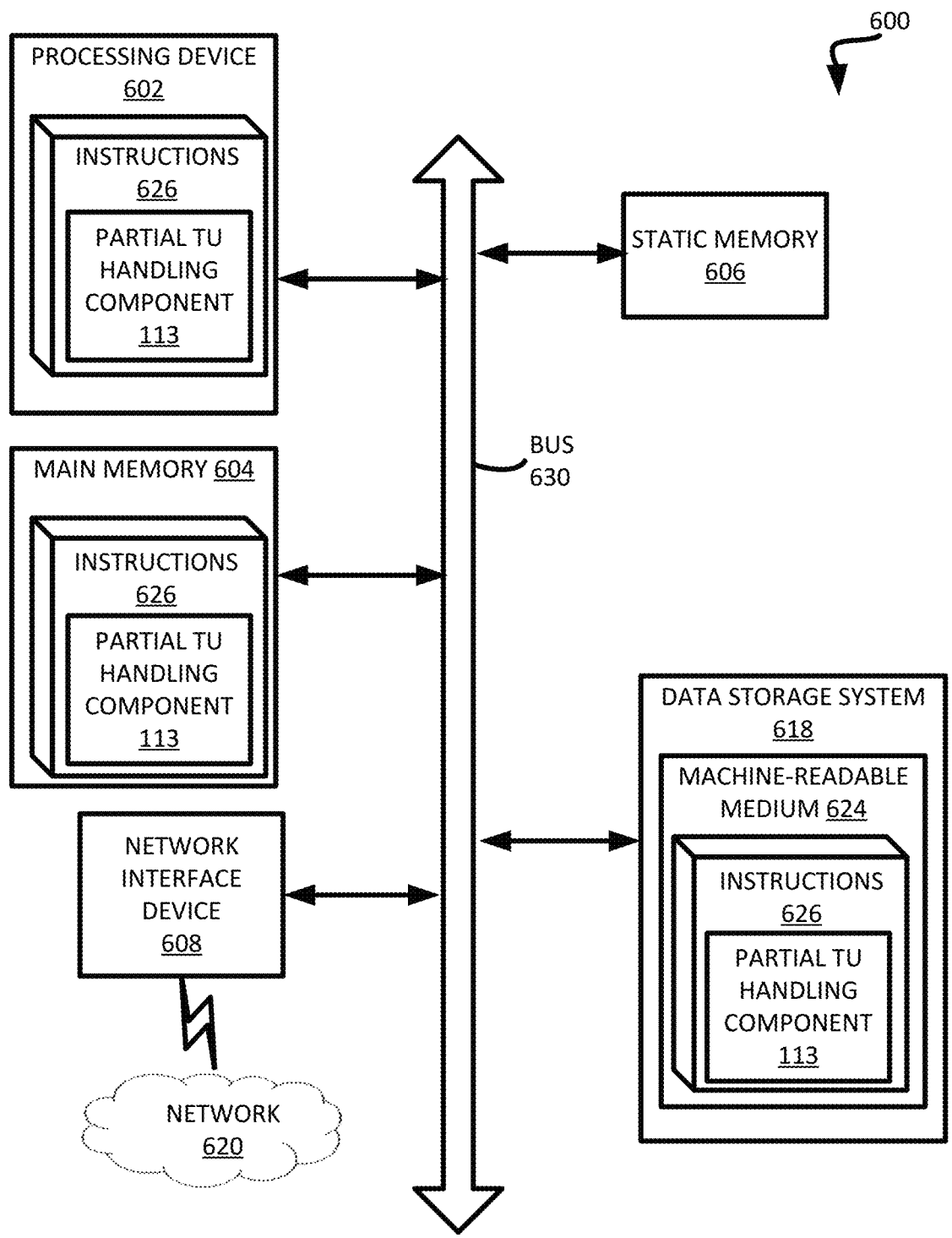
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the partial TU handling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a partial TU handling component (e.g., the partial TU handling component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
determining that at least one portion of a write request, to a first translation unit of a plurality of translation units, does not align fully with the first translation unit;
identifying a first entry in a translation map, the translation map comprising a plurality of entries, each entry mapping a translation unit of the plurality of translation units to a corresponding physical block of a plurality of physical blocks, wherein the first entry identifies a first physical block corresponding to the first translation unit;
designating a first part of the first entry as invalid indicating that a first portion of the first physical block contains invalid data, wherein the first part of the first entry corresponds to a portion of the first translation unit that aligns with the at least one portion of the write request;
creating a second entry in the translation map, wherein the second entry identifies a second physical block of the plurality of physical blocks, wherein the second physical block is the same size as the first physical block;
linking the second entry to the first entry, such that the first entry and second entry correspond to the first translation unit;
writing, to a portion of the second physical block associated with the portion of the first translation unit that aligns with the at least one portion of the write request, a set of data corresponding to the at least one portion of the write request; and
designating a second part of the second entry as invalid data, wherein the second part of the second entry corresponds to a remaining portion of the second physical block that does not align with the at least one portion of the write request.

2. The system of claim 1, wherein the first translation unit comprises a predefined number of logical pages and represents a base granularity of data managed by the memory device.

3. The system of claim 1, determining that the at least one portion the write request does not align fully with the first translation unit further comprises:
determining that a starting logical address indicated in the write request does not correspond to a starting address of the first translation unit.

4. The system of claim 1, wherein the at least one portion of the write request is a last element of a set of translation units specified by the write request.

5. The system of claim 1, wherein the processing device is further to perform operations comprising:
determining that the first physical block comprises existing valid data.

6. The system of claim 1, wherein the processing device is further to perform operations comprising:
designating the first physical block and the second physical block as priority for garbage collection.

7. A method comprising:
determining that at least one portion of a write request, to a first translation unit of a plurality of translation units, does not align fully with the first translation unit based on a starting logical address not corresponding to a starting address of a first translation unit;
identifying a first entry in a translation map, the translation map comprising a plurality of entries, each entry mapping a translation unit of the plurality of translation units to a corresponding physical block of a plurality of physical blocks, wherein the first entry identifies a first physical block corresponding to the first translation unit;
designating a first part of the first entry as invalid indicating that a first portion of the first physical block contains invalid data, wherein the first part of the first entry corresponds to a portion of the first translation unit that aligns with the at least one portion of the write request;
linking a second entry in the translation map to the first entry, wherein the second entry identifies a second physical block of the plurality of physical blocks, wherein the second physical block is the same size as the first physical block; and
writing, to a portion of the second physical block associated with the portion of first translation unit that aligns with the at least one portion of the write request, a set of data corresponding to the at least one portion of the write request; and
designating a second part of the second entry as invalid data, wherein the second part of the second entry corresponds to a remaining portion of the second physical block that does not align with the at least one portion of the write request.

8. The method of claim 7, wherein the first translation unit comprises a predefined number of logical pages and represents a base granularity of data managed by a memory device coupled with a processing device.

9. The method of claim 7, further comprising:
prior to linking the second entry to the first entry, creating, by the processing device, the second entry in the translation map.

10. The method of claim 7, wherein the second entry corresponds to the first translation unit.

11. The method of claim 7, further comprising:
determining that the first physical block comprises existing valid data.

12. A non-transitory computer-readable storage medium comprising instructions that, when executed by a processing device, cause the processing device to:
determine that at least one portion of a write request, to a first translation unit of a plurality of translation units, does not align fully with the first translation unit, wherein the at least one portion of the write request is a last element of a set of translation units specified by the write request;
identify a first entry in a translation map, the translation map comprising a plurality of entries, each entry mapping a translation unit of the plurality of translation units to a physical block of a plurality of physical blocks, wherein the first entry identifies a first physical block corresponding to the first translation unit;
designating a first part of the first entry as invalid indicating that a first portion of the first physical block contains invalid data, wherein the first part of the first entry corresponds to a portion of the first translation unit that aligns with the at least one portion of the write request;
link a second entry in the translation map to the first entry, wherein the second entry identifies a second physical block of the plurality of physical blocks;
write, to the second physical block associated with the first translation unit, a set of data corresponding to the at least one portion of the write request; and
designating a second part of the second entry as invalid data, wherein the second part of the second entry corresponds to a remaining portion of the second physical block that does not align with the at least one portion of the write request.

13. The non-transitory computer-readable storage medium of claim 12, wherein the first translation unit comprises a predefined number of logical pages and represents a base granularity of data managed by a memory device coupled with the processing device.

14. The non-transitory computer-readable storage medium of claim 12, wherein the processing device is further to:
prior to linking the second entry to the first entry, create the second entry in the translation map.

15. The non-transitory computer-readable storage medium of claim 12, wherein the second entry corresponds to the first translation unit.

16. The non-transitory computer-readable storage medium of claim 12, wherein the first physical block comprises existing valid data.

* * * * *